United States Patent [19]
Russo

[11] Patent Number: 4,709,720
[45] Date of Patent: Dec. 1, 1987

[54] AUTOMATICALLY LOCKING VALVE

[75] Inventor: Onofrio N. Russo, Middle Village, N.Y.

[73] Assignee: Gas Energy, Inc., Brooklyn, N.Y.

[21] Appl. No.: 925,621

[22] Filed: Oct. 31, 1986

[51] Int. Cl.⁴ .............................................. F16K 35/00
[52] U.S. Cl. ................................... 137/385; 251/367; 70/179
[58] Field of Search ................ 137/385; 251/366, 367; 70/179

[56] References Cited

U.S. PATENT DOCUMENTS

| 703,564 | 7/1902 | Ellison | 70/179 |
|---|---|---|---|
| 2,631,577 | 3/1953 | Carter | 251/363 |
| 3,614,203 | 9/1986 | Russo | 137/385 |
| 3,722,853 | 3/1973 | Dargatz et al. | 137/385 |
| 4,483,366 | 11/1984 | Labita | 137/385 |

FOREIGN PATENT DOCUMENTS 633462 12/1961 Canada .................. 137/385

Primary Examiner—A. Michael Chambers
Attorney, Agent, or Firm—Fitzpatrick, Cella, Harper & Scinto

[57] ABSTRACT

A locking valve has a housing defining a fluid flow passageway, a stem bore and a lock bore intersecting the stem bore. A plug or stem may seat in the stem bore for movement between passageway opening and closing positions. A locking device is disposed in the lock bore and is arranged automatically to arrest and prevent movement of the stem upon its movement to a desired locked position such as when it closes the passageway.

3 Claims, 9 Drawing Figures

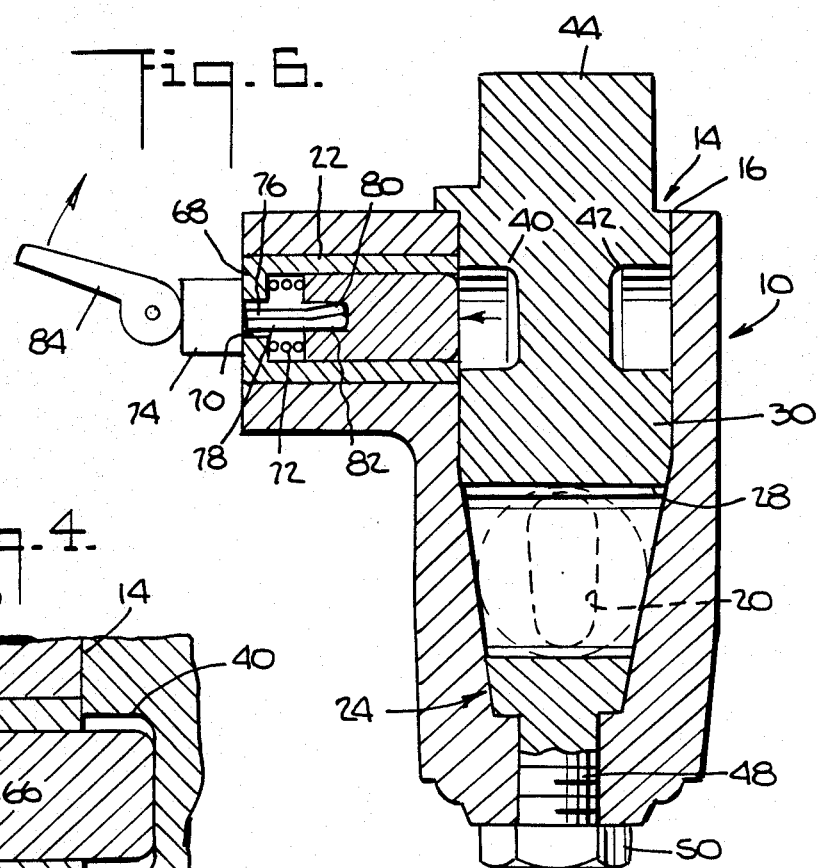
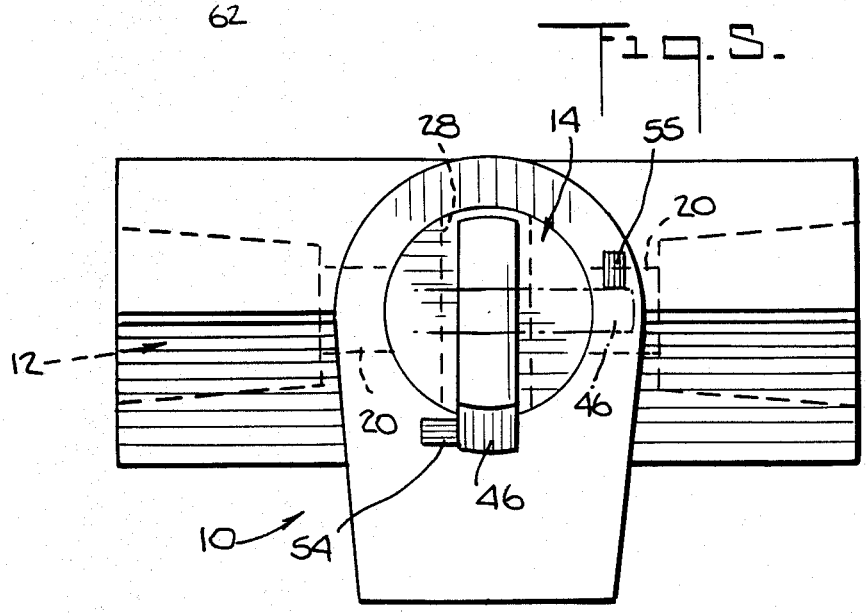

AUTOMATICALLY LOCKING VALVE

BACKGROUND OF THE INVENTION

1. Field of the Invention

The present invention relates to locking valves, and more particularly, to such valves having means which may be used automatically to secure them in desired positions, that is, in open or closed position, in pipe lines such as gas supply pipe lines.

Numerous automatically locking valves have been proposed for such use. These valves have devices which automatically arrest the movable element of the valve whenever it is moved to a closed position so that only an authorized person in possession of the proper key can release the valve element once it has been so arrested. For example, U.S. Pat. No. 2,016,797 teaches a stop lock having a conical plug rotatable over a 360° range. In either of two open positions, 180° from one another, a passageway in the plug is aligned with a passageway of the housing. In either of two closed positions, 180° from one another and 90° from the open positions, the passageway in the plug is not aligned with the passageway in the housing so that the plug occludes the passageway. A pair of recesses are formed on a stem connected to the plug and rotatable therewith. A lock pin is slidably mounted to the housing and is biased toward the stem. The recesses in the stem are arranged so that whenever the plug is in one of its closed positions, one of the recesses will be aligned with the lock pin and the lock pin will enter such recess to arrest the stem and plug. Because the lock pin is recessed within the housing, the lock pin can only be retracted away from the stem to release it by the use of a special key, which is possessed only by authorized persons.

However, the two closed positions of the plug are not differentiated from one another. An unauthorized person might turn the plug to either of its closed positions in an innocent attempt to shut the valve during an emergency. Thus, an authorized person who is called to release the plug after it has been arrested at one of the closed positions will not be able to tell whether the plug is in such position as a result of innocent operation or as a result of tampering. Further, if a tamperer attempts to defeat the locking features of this valve by driving the plug and stem out of the valve housing, the lock pin will bear the full force of such attack.

An alternative form of locking valve is set forth in U.S. Pat. No. 1,275,135. This locking valve also has a plug rotatable between two closed positions and two open positions and a stem which rotates with the plug. Stops on the outside of the housing normally limit the rotation of the stem and plug to a range between a normal closed position and a normal open position. When the stem and plug are in the normal closed position, a spring loaded lock pin slidably carried by the stem enters into a recess in the housing. However, if a tamperer removes the stops on the outside of the housing, he can rotate the stem and plug to an abnormal closed position in which the pin does not engage the recess and he can then rotate the stem and plug back to an open position. Thus, if the external stops on the valve have been defeated, the valve can be closed and opened at will.

U.S. Pat. No. 4,483,366 discloses a locking valve which includes a housing which defines a fluid passageway, a stem bore open to the outside of the housing at one end and a lock bore intersecting the stem bore. The valve also includes an elongated stem having a relatively narrow portion, a relatively wide portion and a circumferential shoulder at the juncture of such portions. The stem has at least one recess in its relatively narrow portion and is coaxially disposed in the stem bore so that the narrow portion of the stem confronts the lock bore and the shoulder of the stem faces towards the open end of the stem bore. A valve element is connected to the stem for movement in conjunction with rotation of the stem between a closed position and an open position. In the preferred embodiment, the valve element is adapted to seat in the stem bore and has a passageway therethrough. In the normal open position the valve element passageway is aligned with the housing fluid passageway to permit fluid communication therethrough. In the normal closed position such fluid communication is prevented. The recess of the stem is arranged so that it is aligned with the lock bore of the housing when the valve element is in one of the aforementioned positions. A sleeve is coaxially mounted in the lock bore so that the sleeve projects into the stem bore adjacent the shoulder of the stem. Thus, the sleeve prevents axial movement of the stem outwardly through the open end of the stem bore. A lock pin is slidably mounted in the bore of the sleeve, and means are provided for blessing the lock pin towards the stem. The lock pin bears on the stem and enters the recess of the stem when such recess is aligned with the lock bore. The lock pin will arrest rotation of the stem and thus of the valve element when one of the recesses of the stem is aligned with the lock bore.

In other embodiments of U.S. Pat. No. 4,483,366, the shape of the recess of the stem is modified for purposes there described.

If an attempt is made to defeat the locking mechanism of the valve by forcibly withdrawing the stem from the housing through the open end of the stem bore, the sleeve will engage the shoulder of the stem. Thus, the sleeve will bear the forces applied to the stem during such an attack and will protect the lock pin from such forces.

Other locking valves are described in the following U.S. Pat. Nos. 359,714; 703,564; 1,231,164; 1,240,734; 1,325,189; 1,696,757; 2,058,951; 3,450,148; 3,540,481; and 3,560,130.

SUMMARY OF THE INVENTION

I have conceived and contribute by the present invention a locking valve which represents an improvement over known constructions of the class described such as the device disclosed in U.S. Pat. No. 4,483,366. Thus, my valve is stronger and more resistant to tampering, unauthorized manipulation and forcible withdrawal of the stem from the housing. Moreover, I achieve these advantages by providing an automatically locking valve which is less expensive and easier to manufacture than the locking valve of U.S. Pat. No. 4,483,366 and which utilizes less parts.

According to one aspect of my invention, there is provided a locking valve that includes a housing defining a passageway through which fluid may flow, a stem bore for receiving a valve plug or stem, and a lock bore that intersects the stem bore. A valve plug or stem may seat in the stem bore of the housing for movement through a range of positions encompassing a closed position in which the valve stem occludes the passageway to prevent the flow of fluid therethrough, and an open position in which the stem permits the flow of fluid through the passageway.

I prefer to form the stem with a cylindrical region or portion that confronts the lock bore and with at least one recess in that annular portion of the stem.

Lock means are positioned in the lock bore automatically to arrest movement of the stem upon its movement to one of the positions mentioned above. To this end, the lock means includes a pin which may be of uniform perimetrical configuration along its length slidably mounted relative to the lock bore and means, such as a spring, for biasing the pin toward the stem so that a portion of the pin will enter a recess of the stem when the recess is aligned with the stem bore. Actually, I prefer that the lock means also include a sleeve mounted in the lock bore, the pin being slidably mounted in the sleeve.

In view of the perimetrical configuration of the pin, the more expensive shouldered formation of the pin of U.S. Pat. No. 4,483,366 is eliminated and, as a result, the in-turned end of the sleeve 60 of that patent is also eliminated thus rendering the sleeve relatively simple and less expensive. Moreover, in the limited space available, my pin may be of greater cross-sectional area than that of the patent thus to afford greater locking strength and security against rotational or axial movement of the stem relative to the housing. The sleeve is fixedly mounted in the lock bore and to effect this fixation I may form the bore surface or the sleeve surface with elongate projections to cut into the opposing surface when the sleeve is inserted into the bore, or I may form an annular groove in the surface of the lock bore and one in the exterior surface of the sleeve, these grooves being adapted to register with each other when the sleeve is inserted in the lock bore, a ring, such as a snap ring, extending into both grooves to prevent withdrawal of the sleeve from the lock bore. I prefer that the groove in the lock bore be of a width somewhat greater than the width of the groove in the sleeve, these widths being measured in a direction parallel to the axial length of the pin, as viewed in the drawing.

According to another aspect of the present invention, and for a purpose later to be described, the valve stem is formed with a radially extending bore, preferably a through bore, opening into the at least one recess of its cylindrical portion and the pin is formed with a longitudinally extending through bore registering with the bore in the stem. It is preferred that the bore in the pin be of a slightly greater radial dimension than the bore in the stem.

Additionally, the sleeve is formed with an in-turned flange or end piece at its end remote from the stem and a hole is defined by this flange or end piece for reception of a key to retract the pin from the stem recess in a manner later to be described.

The pin is formed, at its end remote from the stem, with means for receiving the key entering the sleeve through the keyhole so that the pin may be drawn toward the sleeve flange and away from the annular portion of the stem against the action of the biasing means.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

DESCRIPTION OF THE DRAWINGS

Specific embodiments of the invention have been chosen for purposes of illustration and description, and are shown in the accompanying drawing, forming a part of the specification wherein:

FIG. 4 is a fragmentary view, on an enlarged scale, of the area indicated by the numeral 4 in FIG. 2;

FIG. 5 is a top plan view of the valve depicted in FIGS. 1 through 4;

FIG. 6 is a schematic view of a key in active position relative to a lock assembly associated with the valve.

DETAILED DESCRIPTION OF THE PREFERRED EMBODIMENTS

For purposes of explanation, I shall describe my invention as it relates to a valve similar to that of U.S. Pat. No. 4,483,366 although those skilled in the art will appreciate that my inventive concept is not limited to valves of the precise structural characteristics of the valve mechanism there disclosed.

Figure 1:
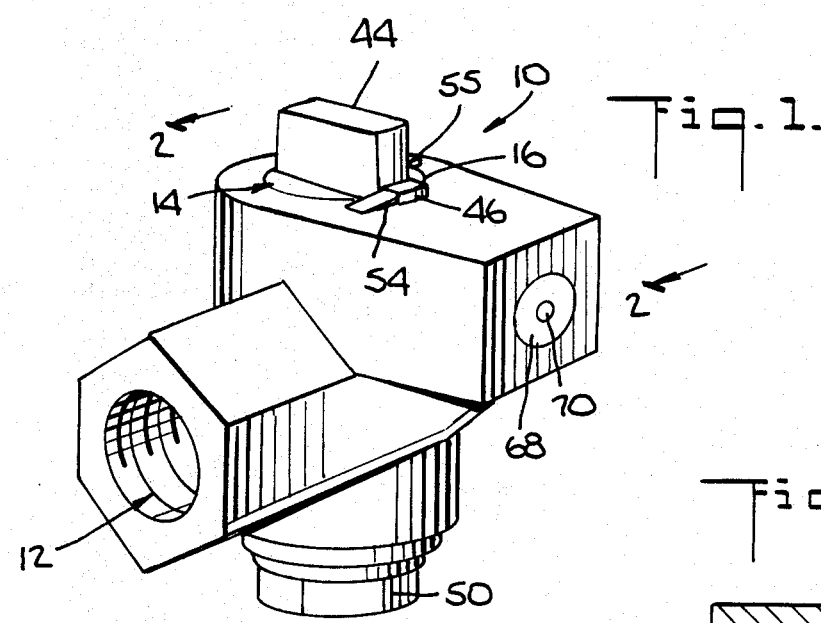
FIG. 1 is a perspective view of a valve according to one embodiment of the present invention.
Figure 2:
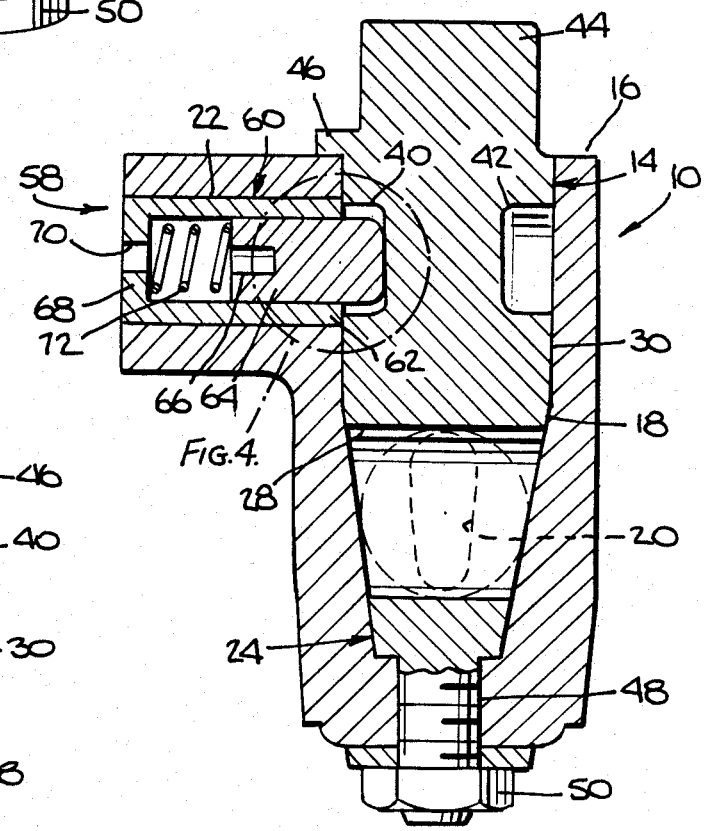
FIG. 2 is a sectional view taken along line 2—2 in FIG. 1.

As seen in FIGS. 1, 2 and 5, a valve according to the preferred embodiment of the present invention includes a housing 10 which defines a fluid passageway 12 open at both ends; ordinary pipe threads being provided at the ends of the passageway in the conventional manner. The housing also defines a stem bore 14 which is open to the exterior of the housing at the top 16 (FIG. 2). The stem bore 14 intersects the passageway 12, and is tapered at its intersection with the passageway to form a frusto conical seat 18. As seen in FIGS. 2 and 5, the passageway 12 has narrowed portions 20 adjacent to its intersection with the stem bore. The housing also defines a lock bore 22 which communicates with the outside of the housing and perpendicularly intersects the stem bore 14 between its tapered seat 18 and its open end 16.

Figure 3:
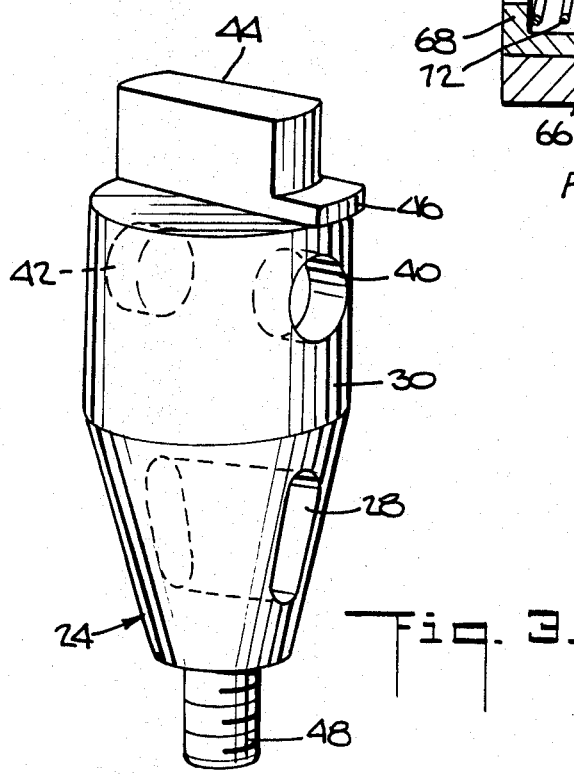
FIG. 3 is a perspective view of the stem and valve element of the valve depicted in FIGS. 1 and 2.

The valve also includes a valve element or stem which, in the embodiment depicted, takes the form of a tapered frusto-conical part (FIGS. 2 and 3). The stem has a bore 28 extending therethrough transverse to its axis and has a cylindrical portion 30, and a pair of diametrically opposed radial recesses 40 and 42 are formed in portion 30 of the stem.

A wrenching lug 44 projects axially from the top of the cylindrical portion 30, a stop wing 46 projects radially from the wrenching lug 44 and a threaded extension 48 projects axially from the tapered plug 24.

As best seen in FIG. 2, the stem is coaxial with the stem bore 14 and is rotatable therein. When the tapered part 24 is seated in tapered seat 18, the annular portion 30 of the stem confronts the lock bore 22 of the housing and the wrenching lug 44 of the stem projects beyond the surface of the housing at the open end of the stem bore, so that the valve element can be rotated by engaging the wrenching lug. The threaded extension 48 of the plug projects through a hole in the housing at the bottom thereof. A nut 50 engages extension 48 to retain the stem in position, and a washer 52 is interposed between the nut 50 and the housing.

A normal closed stop 54 and a normal open stop 55 (FIGS. 1 and 5) are formed at the top and on the outside of the housing adjacent the open end of the stem bore. These stops cooperate with stop wing 46 of wrenching lug 44 to limit rotation of the stem and plug to a range of positions encompassing approximately 90° of rotation. This range of positions includes, at one extreme, the normal closed position depicted in FIGS. 1 and 2 and shown in solid lines in FIG. 5. When the stem and tapered plug are in this normal closed position, stop wing 46 abuts stop 54 and bore 28 of tapered part 24 does not communicate with passageway 12. In the closed position, because bore 28 is not aligned with the passageway, the tapered part prevents passage of fluid through the valve. Also, when the tapered part is in the closed position, first recess 40 of the stem is aligned with lock bore 22 of the housing.

The range of positions defined by the stops 54 and 55 also includes a normal open position at its other extreme. When the valve element is in this open position, stop wing 46 abuts the normal open stop 55 as indicated at 46' in FIG. 5. In this position, bore 28 is aligned with passageway 12 and thus permits fluid communication through the valve. When the tapered part is in this open position, neither of the recesses 40 and 42 of the stem is aligned with lock bore 22.

As best seen in FIGS. 2 and 4, a lock assembly 58 is mounted in lock bore 22 of the housing. Lock assembly 58 includes a hollow cylindrical sleeve 60 mounted in lock bore 22 by a press fit or by striating the lock bore surface or the sleeve surface, so that one end 62 of the sleeve is flush with the inner end of stem bore 14 closely confronting the cylindrical surface of annular portion 32 of the stem. A lock pin 64 is coaxially received in the bore sleeve 60, and is slidably supported by and within the sleeve, this lock pin having a cylindrical bore 66. The pin is of uniform perimetrical configuration along its length and may be round, rectangular, hexagonal or of any convenient configuration, the inner surface of the sleeve 60 conforming to the selected perimetrical configuration of the pin. The outer end of the sleeve 60 remote from the stem is closed or flanged as at 68 and has a narrow hole or opening 70 for a purpose later to be described. A coil spring 72 is disposed and compressed between closure 68 and lock pin 64 so that the spring biases the lock pin towards the stem when the pin bears against the cylindrical portion 30 of the stem.

Thus, for example, when the tapered part of the stem is in its open position, or in any position between the open position and the closed position, the inner end of lock pin 64 rides on the surface of the cylindrical portion 30. However, when the tapered part is rotated to the closed position, as seen in FIGS. 2 and 4, the inner end of lock pin 64 enters recess 40 and thus arrests further rotation of the stem. It will be understood that the stem may be recessed in a manner to permit it to be locked in open or closed position.

The stem can only be released, once it is so arrested, by drawing lock pin 64 back away from the stem (towards the left as seen in FIG. 2) against the bias of coil spring 72. However, because the lock pin is concealed within the housing and protected by the closure 68, it is very difficult to engage the lock pin and retract it in this manner except by use of a key of the type known in the gas utility industry as a "Smith-Morse" key, or the like.

As seen in FIG. 6, this key has a body 74 and a pair of elongated fingers 76 and 78 projecting from the body. The fingers 76 and 78 have bulbous end portions 80 and 82 respectively, and have mating sloping surfaces adjacent to such end portions. An eccentric cam 84 is pivotally mounted to the body 74 and appropriate mechanisms (not shown) are provided for moving finger 78 so that, when cam 84 is moved from the position illustrated in FIG. 6, end portion 82 of finger 78 is brought alongside finger 76. This effectively enlarges the diameter of the distal end of the key. After expansion of the distal end of the key in this fashion, continued movement of cam 84 draws finger 78 toward body 74.

This key may be utilized to draw back the lock pin 64 of the valve. The key is inserted through hole 70 in closure 68 into bore 66 of the lock pin until the body 74 of the key bears on the exterior surface of closure 68. After the key has been so inserted, cam 84 is rotated. Expansion of the distal end of the key causes the same to engage the interior surface of bore 66 in the lock pin. Continued motion of the lever draws the finger 78, and thus the engaged lock pin, back toward the body of the key and away from the stem to unlocking position, as shown in FIG. 6, so that the stem and tapered plug may be rotated in the valve housing.

The key is ordinarily possessed only by authorized persons. Therefore, it will be extremely difficult if not impossible for an unauthorized person to reopen the valve after turning it to its closed position.

Figure 7:
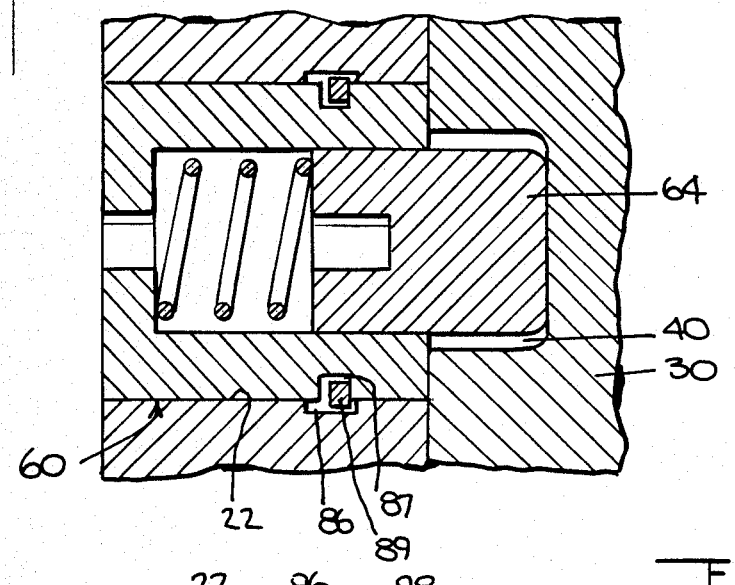
FIG. 7 is a partial sectional view illustrating a ring interlock for preventing withdrawal of the sleeve from the lock bore in the housing.

Another and preferred way to secure the sleeve 60 in the lock bore 22 is shown in FIG. 7 wherein it is seen that the surface of the lock bore 22 is formed with an annular groove 86 and a second annular groove 87 is formed in the exterior surface of the sleeve 60. These two grooves are disposed to register with each other when the sleeve is inserted into the lock bore to its operating position. A snap ring 89 is provided so as radially to extend into both grooves to prevent withdrawal of the sleeve from the lock bore. I prefer to form the groove 86 of greater width than the width of groove 87, the width dimensions being taken in a direction parallel to the longitudinal axis of the lock pin 64. In this way, if an attempt is made forcibly to withdraw the sleeve 60 from the lock bore, it will shift outwardly by a slight amount, not enough to prevent operation of the lock, but sufficient to give a visual indication that an attempt to remove the sleeve had been made.

Figure 8:
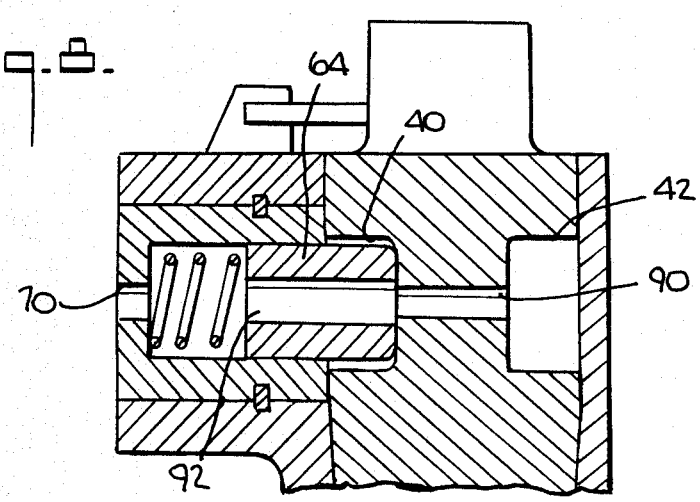
FIG. 8 is a partial sectional view illustrating structural features of the valve stem and lock pin for defeating unauthorized manipulation of the lock.

In the embodiment shown in FIG. 8, I provide a radially extending bore 90 in the valve stem opening into the recesses 40, 42 and a longitudinally extending through bore 92 in the pin 64 adapted to register with the bore 90 in the stem when the stem is in valve closing position, for example. I prefer that the bore 92 in the pin 64 be of slightly greater radial dimension than the bore 90 and the keyhole 70.

By reason of this arrangement, if a nail or rod is inserted through the keyhole in an attempt to wedge it to the pin 64, it will pass through the pin and will enter the bore 90 in the valve stem so that its withdrawal will not draw the pin 64 out of its recess in the stem. In the event that an adhesive is applied to the end of the nail or rod, upon insertion of the latter, it will adhere to the stem so that application of a withdrawal force will not move the pin 64.

Figure 9:
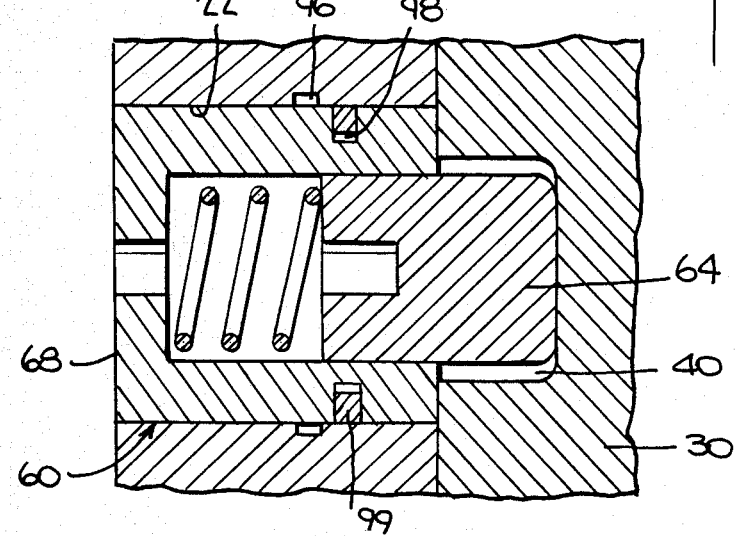
FIG. 9 is a view similar to FIG. 7, but illustrating another security arrangement.

In the embodiment shown in FIG. 9, the structural arrangement is similar to that of FIG. 7 except that the annular grooves 96 and 98 in the surface of the lock bore 22 and the sleeve 60, respectively, are of the same width and are not in register when the exterior face of the sleeve 60 and the closure 68 are flush with the exterior surface of that part of the valve housing that defines the lock bore, although a snap ring 99 is positioned in the groove 98. By reason of this construction, if an attempt is made to draw the lock sleeve 60 from the bore 22, against the force of the press fit, if the sleeve does start to slide out, the snap ring will limit its movement to that position at which the grooves 96 and 98 register. The lock will not have moved enough to prevent it from functioning but the snap ring 99, having expanded so as partially to extend into each groove 96 and 98, will prevent the lock sleeve from moving further out of the bore 22. However, in this position the exterior faces of the sleeve 60 and closure 68 will no longer be flush with the outer surface of that part of the valve body that defines the bore 22 so that it will be obvious that an attempt had been made to tamper with the device. In this case, if the tamperer attempts to push the sleeve 60 back to its flush position, the ring 99, now extending into both grooves 96 and 98 will defeat such an effort.

From the foregoing description, it will be seen that I contribute an automatically locking valve which, while similar to known valves of the class described, includes a lock assembly utilizing a minimum number of parts and that these are of simple construction comprising a tubular sleeve closed at one end and having a keyhole in the closure, a spring, a mandrel or lock pin of uniform perimetrical configuration along its length and bored at one end to receive a key and in one arrangement, a snap ring. As mentioned, the exterior of the sleeve may be striated or knurled for the purpose mentioned, or the registering grooves and snap ring may be used. Moreover, the lock pin and valve stem may be bored to resist tampering.

I believe that the construction and operation of my novel automatically locking valve will now be understood and that the advantages thereof will be fully appreciated by those persons skilled in the art.

I claim:

1. A locking valve comprising:
    a housing defining a passageway, a stem bore and a lock bore intersecting said stem bore;
    a valve stem seated in said stem bore for movement through a range of positions encompassing a closed position in which said valve stem occludes said passageway and an open position in which said valve stem permits fluid flow through said passageway;
    said stem being formed with a cylindrical portion confronting said lock bore and with at least one recess in said cylindrical portion;
    lock means disposed in said lock bore for automatically arresting movement of said stem upon its movement to one of said positions, said lock means including a sleeve mounted in said lock bore, a pin mounted in said sleeve for axial movement therein and means biasing said pin toward said stem so that a portion of said pin will enter said at least one recess upon movement of said stem to a position in which said recess is aligned with said lock bore;
    an annular groove in the surface of said lock bore and a second annular groove formed in the exterior surface of said sleeve, said grooves being out of register when said sleeve is inserted to a desired operable position in said lock bore and being adapted to come into register upon axial movement of said sleeve in a direction away from said stem; and
    security means in said groove in said sleeve for limiting said axial movement of said sleeve beyond that position at which said grooves come into registry.

2. A locking valve according to claim 1 wherein said security means is a snap ring.

3. A locking valve according to claim 1 or 2 wherein said grooves and said security means are so arranged that once said grooves are brought into registry, said security means prevents further relative movement of said sleeve and said lock bore in either axial direction.

* * * * *

UNITED STATES PATENT AND TRADEMARK OFFICE
CERTIFICATE OF CORRECTION

PATENT NO. : 4,709,720

DATED : December 1, 1987

INVENTOR(S) : ONOFRIO N. RUSSO

It is certified that error appears in the above-identified patent and that said Letters Patent is hereby corrected as shown below:

COLUMN 2, line 26, "blessing" should read --biasing--.

Signed and Sealed this

Tenth Day of May, 1988

Attest:

DONALD J. QUIGG

Attesting Officer

Commissioner of Patents and Trademarks